UNITED STATES PATENT OFFICE.

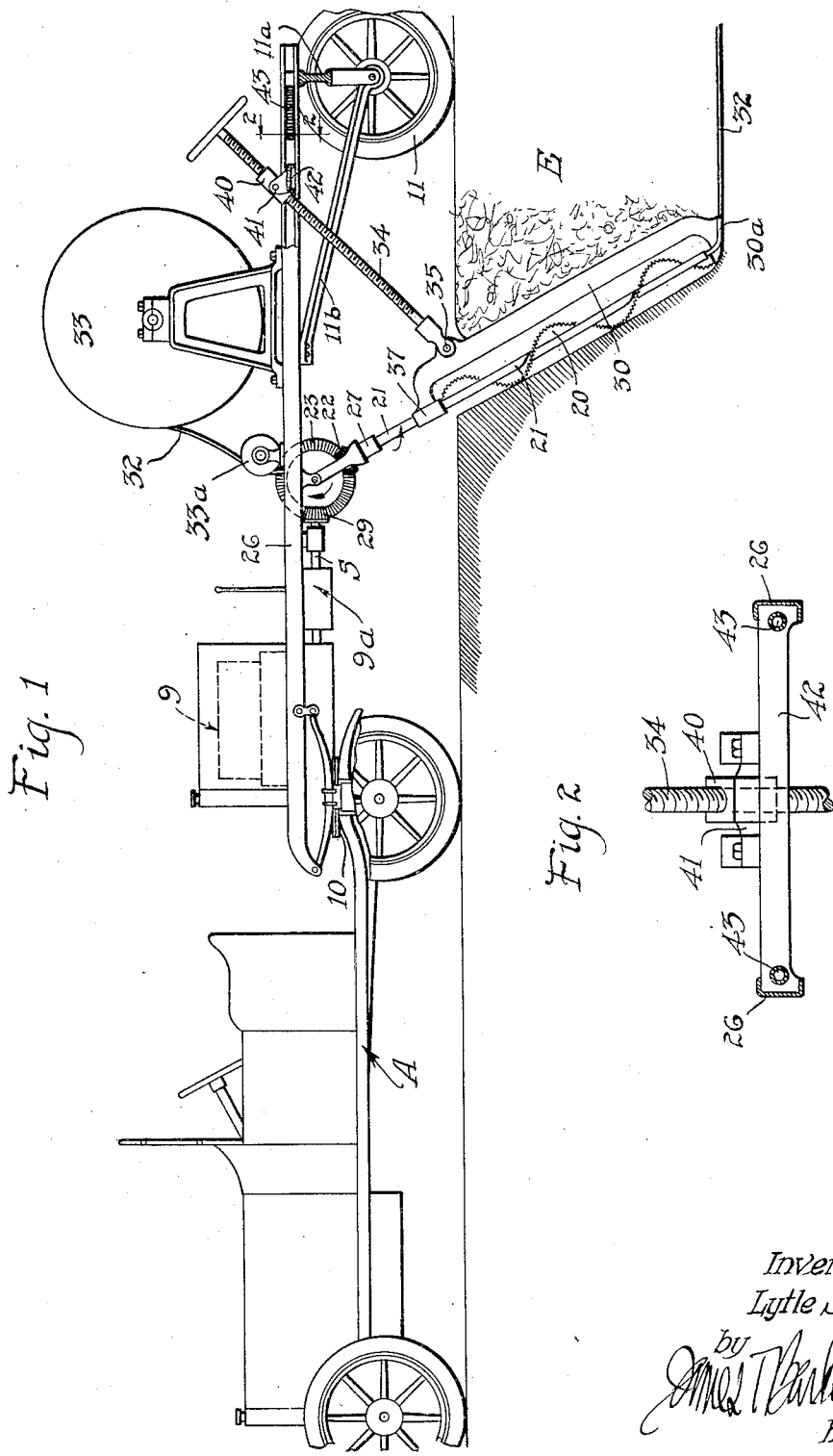

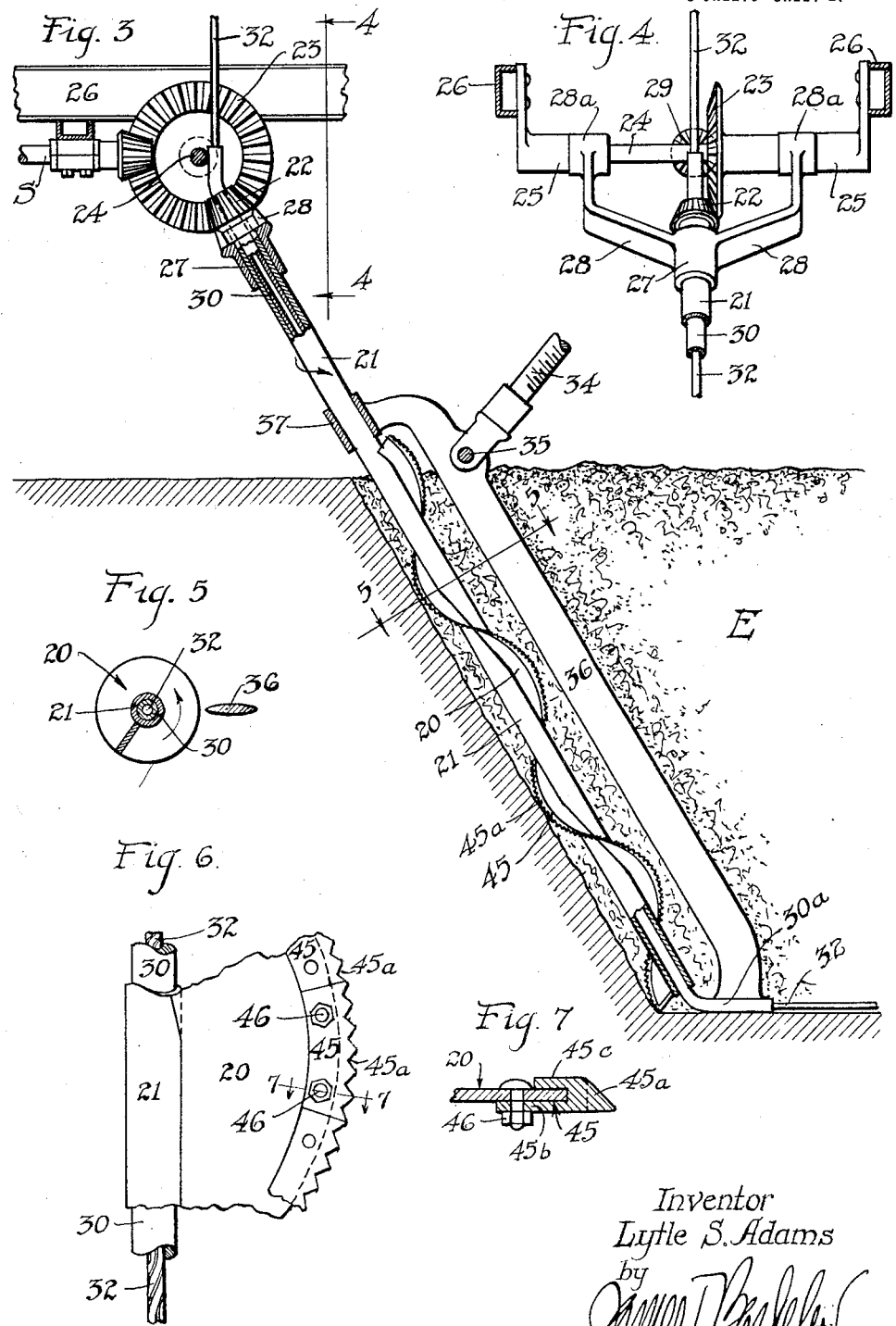

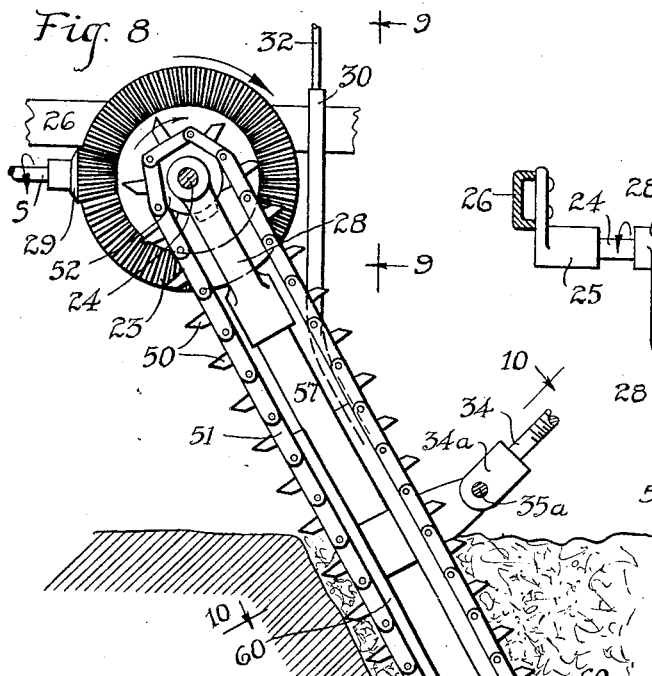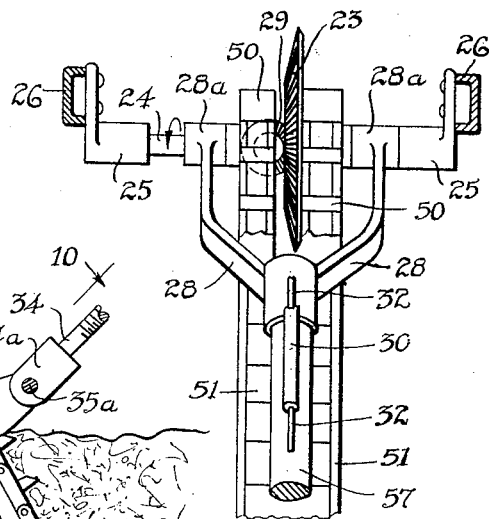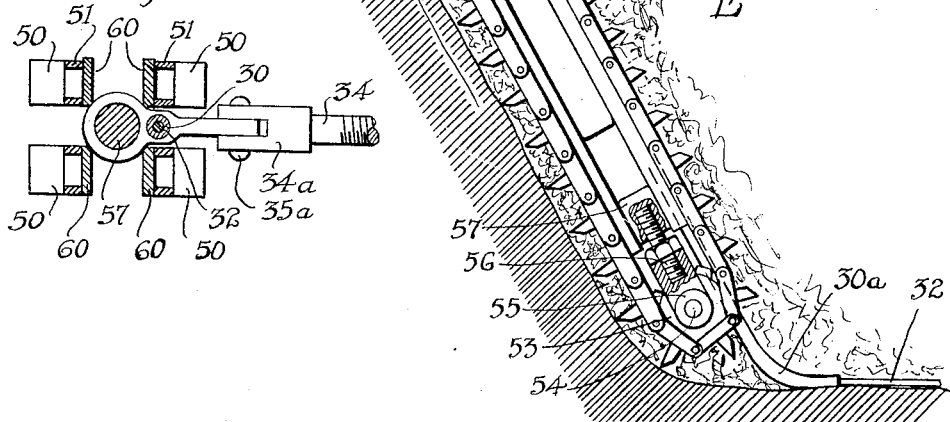

LYTLE S. ADAMS, OF VENICE, CALIFORNIA.

CABLE-LAYING MACHINE.

1,337,184.	Specification of Letters Patent.	Patented Apr. 20, 1920.

Application filed December 16, 1918. Serial No. 267,950.

*To all whom it may concern:*

Be it known that I, LYTLE S. ADAMS, a citizen of the United States, residing at Venice, in the county of Los Angeles, State of California, have invented new and useful Improvements in Cable-Laying Machines, of which the following is a specification.

This invention relates to that class of machinery generally known as excavating machinery; and an object of the invention is the provision of a machine for expeditiously and economically laying a cable beneath the ground surface.

It is a feature of the invention that my machine does not actually remove the soil or the major portion of it from the trench in which the cable is laid, but on the other hand disturbs the soil and lays the cable under the soil without removing the soil bodily. In previous excavating machinery of which I am aware, there has usually been used a means for actually excavating the earth from a trench, then the cable or the like is laid and then the removed earth is replaced; but this is not the method of procedure with my improved machine. My improved machine utilizes a soil loosener or disturber which is moved through the soil; and a means for laying a cable from and behind the lower end of the soil disturbing means, so that the cable is laid immediately under the disturbed soil without the necessity of removing the soil bodily.

A detailed description of a preferred form of mechanism will render the invention clear and intelligible; and I therefore proceed to such a detailed description, reference being had for this purpose to the accompanying drawing, in which—

Figure 1 is a side elevation showing a preferred form of my complete cable-laying machine as it appears in action; Fig. 2 is an enlarged cross section on line 2—2 of Fig. 1; Fig. 3 is an enlarged sectional detail of the soil disturbing and cable-laying parts of the mechanism; Fig. 4 is a detail section taken as indicated by line 4—4 of Fig. 3; Fig. 5 is a section on line 5—5 of Fig. 4; Fig. 6 is an enlarged detail of the soil disturbing element; Fig. 7 is an enlarged section on line 7—7 of Fig. 6; Fig. 8 is a sectional view similar to Fig. 3 but showing a modified form of soil-disturbing and cable laying mechanism; Fig. 9 is a detail view taken as indicated by line 9—9 on Fig. 8; and Fig. 10 is a section on line 10—10 of Fig. 8.

I shall first explain in detail the forms shown in Figs. 1 to 7; and for this purpose explain first the general arrangement and means of operation of my machine. I preferably mount my cable laying machine upon a trailer truck; although it will be obvious that my machine may be mounted upon a truck which is self-propelling. However, for conservation of power, I prefer to make the arrangement as illustrated. This trailer truck may be connected by a swivel attachment 10 (usually known as a fifth wheel) with the rear end of the frame of an automobile A. The automobile A performs the service of progressing the whole mechanism over the ground, while the trailer truck T performs the service of carrying the cable laying machinery and of providing the power to operate that machinery. The engine 9 of the trailer truck T is used for power for the soil disturbing mechanism; and in a preferred arrangement I may obtain power for the soil disturbing mechanism from the transmission shaft S of the trailer truck. I may use the usual change-speed transmission $9^a$ to obtain various driving speeds for the soil disturbing mechanism. It will be evident that I may make the trailer truck from any automobile or automobile truck by the simple expedient of removing the front wheels and substituting the fifth wheel 10, and removing the transmission connection to the rear wheels 11. I also preferably remove the rear springs and support the frame on a solid support on the rear axle $11^a$, using a brace $11^b$ from the frame to the axle. This rear axle may be made specially for the purpose, being preferably bent up in its middle to allow the soil disturbing mechanism to be raised when out of operation.

In the form shown in Figs. 1 to 4 I utilize as a soil disturbing element, a spiral soil digger 20 which is mounted upon a hollow shaft 21. This hollow shaft is driven by means of a bevel gear 22 mounted upon its upper end and meshing with a bevel gear 23 which runs upon a cross-shaft 24, mounted in bearings or mountings 25, which may be mounted upon the side frames 26 of the trailer truck T. The upper end of hollow shaft 21 is journaled in a bearing 27 carried by a yoke 28 which has bearings 28ᵃ on the shaft 24; provision being thus made for allowing the shaft 21 to swing about shaft 24 as a center, so as to raise and lower shaft 21 and the spiral digger 20. When not in use these parts are raised to a position under the truck frame and above the ground surface. A bevel gear 29 on transmission shaft S drives the gear 23; and thus the hollow shaft and spiral digger element are driven from the engine of the truck T.

Inside the hollow shaft 21 there is a cable tube 30 whose lower end projects below the end of the hollow shaft and is bent so as to project substantially rearwardly horizontally, as indicated at 30ᵃ. The spiral soil digger may at its lower end somewhat overhang the lower end of hollow shaft 21, so as to dig as low as the lowest part of the cable tube 30. The cable 32 is fed down through this cable tube over a sheave 33ᵃ from a cable drum 33. In order to hold the spiral digger element and the shaft 21, etc., in the proper soil-engaging position (such an angular trailing position as is shown in the drawings), and to raise and lower the parts, I provide a suitable adjustable brace or strut, in the form of a screw-threaded brace-rod 34 which is swivelly attached at 35 to a yoke frame 36. This yoke frame may have a bearing at its upper end at 37 holding the revolving hollow shaft 21, and may be permanently and rigidly attached at its lower end to the part 30ᵃ of the cable tube. This yoke frame 36 is preferably thin as is best shown in the section of Fig. 5, and may be somewhat sharp-edged; so as to pass easily through the disturbed soil E. The upper end of screw-threaded rod 34 is mounted in a swivel nut 40 which is swiveled at 41 on a cross frame 42 which is slidable in the frame 26 of truck T; and the springs 43 may be used behind the transverse frame 42 for the purpose of holding it normally forward. These springs perform a yielding function when the digger strikes a boulder, in order to allow the digger to move upwardly and pass over the boulder rather than be injured thereby. Cable drum 33 may be placed in such a position rearward on the truck frame as to effectually exert its weight to hold the rear end down and thus hold the soil disturbing element in proper ground engagement.

The hollow shaft 21 may, if so desired, be made to have an interior bearing throughout its length upon cable tube 30. The spiral digger element 20 may be of any suitable construction. The construction of such spiral is well known in the conveyer art and needs no detailed description here. However, I may provide the spiral with a serrated edge as is shown in the drawings, and I may provide the edge of the spiral to be made of separate renewable pieces, such as is shown in detail in Figs. 6 and 7. These renewable edge pieces 45 for the spiral may have serrations 45ᵃ in their outer cutting edges, and they may be mounted upon the spiral 20 itself by means of bolts 46, so as to be easily removable and renewable. The edge pieces 45 are preferably so shaped as to completely cover the edge of the spiral 20, so as to protect that edge against wear; being formed with a flange 45ᵇ which is bolted against one face of the edge of the spiral and with an overhanging flange 45ᶜ to overhang the opposite face. These parts 45 may be made so as to fit the edge of the spiral with fair accuracy; and, being bolted thereto, they stiffen and strengthen the spiral and enable it to do much heavier and faster work than it would be able otherwise to do.

The action of the spiral, upon being rotated and being moved forwardly through the soil, is to disturb and loosen the soil. The soil being thus disturbed and loosened by the action of the spiral, the spiral and the other parts may be progressed through the soil, and the cable 32 is left behind and laid under the loosened soil in the rear of the spiral. To start the operation of the machine the end of the cable will be suitably anchored at some point and a beginning trench or hole may be dug and the spiral lowered into it and placed at the proper angle. Operation of the spiral, and progression of the spiral through the soil, then are begun. The spiral and its hollow shaft 21 and the yoke 32 and other parts progress with comparative ease through the soil because the soil is loose. And, furthermore, the spiral is rotated in the proper direction to cause it by its conveying action to partially raise the loosened soil to allow easy progression of the parts mentioned through the loosened soil. It will of course be obvious that the smaller the cubic space actually occupied by the spiral itself and by shaft 21 and yoke 36, etc., the smaller will be the proportion of soil which it is necessary to raise to the surface in order to allow those parts to easily progress through the loosened earth. Also, as a matter of fact, the loosened earth occupies a somewhat greater volume than the solid earth ahead of the spiral; and the stated rotation of the spiral also raises the earth to take care of this situation. Behind the spiral, at a point where the complete operation has been finished, the raised earth for the most part sinks back into the so called "trench."

In Figs. 8 and 9 I illustrate a modified form of mechanism modified to the extent of providing a specifically different form of digging or soil disturbing element. Here the element comprises digging teeth or cutters 50 mounted on chains 51 which pass over upper sprockets 52 on shaft 24 and pass over lower idler sprockets or rollers 53 which are mounted on a shaft 54 supported in a bearing 55 which is adjustable in position so as to keep the chains tight. This bearing 55 may be adjustably mounted (by a screw-threaded stud 56) on the end of a longitudinal element 57 which at its upper end is mounted in yoke 28. The cable tube 30 passes down on the rear side of longitudinal element 57; and the arrangement of the parts is such that the cutting elements 50 leave only a sufficient space between them for the passage of the cable tube 30 between them. The parts move in the direction indicated by the arrows, the forward and lower course of the digger chains traveling upwardly and forwardly; and it will be seen that the digging elements dig against the whole face of the excavation except the small space between the two sets of cutters 50. However, the piece of earth which is left between the two sets of cutters is narrow enough so that it will not stand, but will crumble away. The whole result of the action of the digging element in this form is thus similar to that in the other form first explained. The forward and upwardly moving course of the digging element tends to lift the disturbed and loosened earth, and does lift a portion of it so as to provide a space for the forward passage of the parts of the mechanism; while the rear course of the element, which moves downwardly, tends to carry the lifted earth back into the trench thus formed. The digging element thus described is held to its work in the same manner as hereinbefore described for the other form, by the screw-threaded rod 34, which in this case joins with a yoke 34$^a$ which may connect swivelly at 35$^a$ with the longitudinal element 57. On element 57 I may mount suitable guides 60 against which the digger chains 51 may bear back; so that the digging cutters 50 are firmly supported against the face of the excavation.

Having described a preferred form of my invention, I claim:

1. Machinery of the character described, embodying a movable carriage, mechanism carried thereby for digging and disturbing the soil in a trench formation and for leaving the disturbed soil in the trench so formed, and means for laying a cable or the like rearwardly from said digging and disturbing mechanism; said cable-laying means embodying a cable tube extending downwardly along the digging and disturbing mechanism and delivering the cable rearwardly, and said digging and disturbing element comprising rotating digging and disturbing means entirely surrounding the cable tube.

2. Machinery of the character described, embodying a movable carriage, mechanism carried thereby for digging and disturbing the soil in a trench formation and for leaving the disturbed soil in the trench so formed, and means for laying a cable or the like rearwardly from said digging and disturbing mechanism; said cable-laying means embodying a cable tube extending downwardly along said mechanism and delivering the cable rearwardly, said digging and disturbing mechanism comprising a spiral digger around said cable tube.

3. Machinery of the character described comprising in combination a movable carriage, a hollow shaft mounted on the movable carriage and extending downwardly therefrom, means on the carriage to revolve said shaft, a spiral soil digger on the lower part of said shaft and adapted to dig and disturb the soil in a trenchlike formation as the carriage progresses over the ground surface, and a cable tube extending downwardly through said hollow shaft and adapted to deliver a cable rearwardly from the lower end of said hollow shaft.

4. Machinery of the character described, comprising in combination a movable carriage, a hollow shaft mounted on the movable carriage and extending downwardly therefrom, means on the carriage to revolve said shaft, a spiral soil digger on the lower part of said shaft and adapted to dig and disturb the soil in a trench-like formation as the carriage progresses over the ground surface, and a cable tube extending downwardly through said hollow shaft and adapted to deliver a cable rearwardly from the lower end of said hollow shaft; mounting and driving means for the hollow shaft on said carriage allowing the hollow shaft and the spiral soil digger to be raised and lowered with reference to the carriage, and means for raising and lowering and for holding the hollow shaft in soil engaging position.

5. Machinery of the character described, embodying a movable carriage, a hollow rotatable shaft mounted at its upper end on the carriage and adapted to be projected downwardly therefrom into the soil, means to rotate the hollow shaft, a rotary soil disturber on the shaft, and means to feed a cable or the like downwardly through the hollow shaft.

6. Machinery of the character described, embodying a movable carriage, a hollow rotatable shaft mounted at its upper end on the carriage and adapted to be projected downwardly therefrom into the soil, means to rotate the hollow shaft, a rotary soil disturber on the shaft, and a stationary cable feeding tube extending down through the hollow shaft and having its lower end bent rearwardly to discharge a cable rearwardly at the lower end of the hollow shaft.

7. Machinery of the character described, embodying a movable carriage, a hollow rotatable shaft swingingly mounted at its upper end on the carriage to swing in a vertical plane so that it may be swung down to enter the soil, means to rotate the hollow shaft, a rotary soil disturber on the shaft, means to feed a cable or the like downwardly through the hollow shaft, and means for rigidly holding the hollow shaft in position to hold its soil disturber in operative relation to the soil as the carriage moves and moves the disturber into the soil.

8. Machinery of the character described, embodying a movable carriage, a hollow rotatable shaft swingingly mounted at its upper end on the carriage to swing in a vertical plane, a yoke frame having bearings on the hollow shaft near its lower end and at a point above its lower end, an adjustable brace connected to the yoke frame and extending rearwardly and upwardly and connected to the carriage, a spiral soil disturber on the hollow shaft, means to rotate the shaft, and a stationary cable feeding tube extending downwardly through the hollow shaft and having its lower end projecting therefrom and bent rearwardly.

In witness that I claim the foregoing I have hereunto subscribed my name this 6th day of December, 1918.

LYTLE S. ADAMS.

Witness:
VIRGINIA BERINGER,